United States Patent Office 3,552,914
Patented Jan. 5, 1971

3,552,914
PROCESS OF REFINING BADDELEYITE
Ekkehard Greinacher and Wilhelm Brugger, Essen, Germany, assignors to Th. A.-G. Goldschmidt, Essen, Germany
No Drawing. Filed Jan. 22, 1968, Ser. No. 699,356
Claims priority, application Germany, Mar. 17, 1967,
G 49,598
Int. Cl. C22b 59/00
U.S. Cl. 23—19                                     6 Claims

ABSTRACT OF THE DISCLOSURE

Process for refining baddeleyite. Comminuted baddeleyite is subjected to two successive extraction stages. In the first stage, the comminuted ore is leached with a leaching liquor above 80° C., the liquor containing at least 120 g./l. of HCl, 1 to 30 g./l of fluoride ions and 10 to 50 g./l. of $SO_4$ ions. The leaching liquor may also contain 2 to 20 g./l. of $NO_3$ ions. The solid residue is thereafter leached in a second stage at a temperature below 60° C. with hydrochloric acid containing at least 200 g. of HCl/l.

---

The preferred particle size of the comminuted baddeleyite is below 0.1 mm. The fluoride, sulfate and nitrate ions are advantageously supplied to the leaching liquors by adding the corresponding free acid or ammonium salt. The leaching liquors may be recycled for leaching fresh amounts of baddeleyite.

SUMMARY OF THE INVENTION

The invention is concerned with a process of refining baddeleyite by means of hydrochloric acid at elevated temperatures.

Zirconium oxide is widely used for the production of ceramic wares with dielectric properties, ceramic dyes and for the manufacture of optical glasses or lenses for use in color photography. The raw material is predominantly zirconium silicate. However, as is well known by those skilled in this art, zirconium silicate, from a chemical point of view, is an extremely indifferent and inert substance. With a view to producing zirconium oxide from zirconium silicate, chlorinating, acidic or alkaline digestion of the silicate is necessary. This, in turn, causes considerable corrosion problems and it is well known that the production of zirconium oxide in this manner is not only cumbersome and time consuming, but also extremely expensive.

In order to overcome the drawbacks inherent in the production of zirconium oxide from zirconium silicate, attempts have been made to recover the zirconium oxide from ores in which the zirconium is contained in the form of oxide. Baddeleyite ore which is found in South Africa is an example for such an ore. Baddeleyite is thus obtained in conjunction with apatite in the processing of certain phosphor ores and the amount of baddeleyite which results from the phosphor ore dressing is sufficient to make technical exploitation of the baddeleyite worthwhile.

However, it is difficult to remove from the baddeleyite those contaminations which have a tendency to cause undesired discoloration in the subsequent processing of the zirconium oxide, for example, when the zirconium oxide is used for ceramic purposes. These discolorations are predominantly caused by copper and iron compounds contained in baddeleyite. The copper is usually primarily present as sulfide while the iron contaminates the ore in oxidic form, predominantly as magnetite and ilmenite.

It has previously been suggested to refine natural zirconium earth, as for example, baddeleyite, by extracting the material with boiling hydrochloric acid and thereafter converting the zirconium oxide into zirconium sulfate by treatment with concentrated sulfuric acid or by melting with potassium bisulfate. The zirconium sulfate is then dissolved and ammonia-free zirconium dioxide hydrate is thus obtained, the hydrate then being converted into the zirconium dioxide by means of heating to red heat. This prior art procedure, however, is uneconomical since the entire raw material is digested by the reagents used and is again separated in purified form.

Accordingly, it is a primary object of the present invention to provide a procedure which permits the removal of the contaminants in a selective manner.

Generally, it is an object of the invention to provide a process for the production of pure zirconium dioxide from baddeleyite ore.

Briefly, and in accordance with this invention, it has been ascertained that the contaminants contained in naturally available baddeleyite, such as for example, copper sulfide, copper oxide, iron oxide, silicic acid, magnesium silicate and the like are effectively removed without significant losses of zirconium oxide by proceeding in the following manner: The baddeleyite in comminuted form is first leached in a first stage at a temperature above 80° C. with hydrochloric acid which contains at least 120 g./l. of HCl and which additionally comprises about 1 to 30 g./l. of fluoride ions and 10 to 50 g./l. of sulfate ions. The leaching agent may also advantageously contain 2 to 20 g./l. of $NO_3$ ions. The solid residue material is then treated in a second stage at temperatures below 60° C., preferably below 40° C., with hydrochloric acid containing at least 200 g./l. of HCl. The product thus remaining is then separated, washed and dried.

The comminuted baddeleyite should advantageously have an average particle size of less than 0.1 mm.

In the first leaching stage, the ore is essentially digested and, the copper sulfide oxidized and converted into soluble compounds. At the same time, the silicic acid as well as magnesium silicate are dissolved. Further, a portion of the iron oxide is converted into soluble iron compounds. A significant amount of the iron contained in the baddeleyite precipitates under the conditions of the first acidic leaching step in the form of basic compounds, as for example, the basic ferric sulfate. These iron compounds which are not dissolved in the first stage are brought into solution during the second extraction stage of the inventive procedure so that after washing and drying the leached or extracted baddeleyite consists substantially of pure zirconium oxide which can be directly used for industrial purposes in this form.

As previously mentioned, the acidic leaching agent of the first step should contain about 1 to 30 g./l. of fluoride ions. The exact content of fluoride ions in the leaching agent within the indicated range is calculated on the content of silic acid or silicate compounds in the ore. If, for example, ammonium bifluoride is added to the leaching agent of the first step as the fluoride ion supplying substance, then it is required to add about 3 times the amount by weight of ammonium bifluoride, calculated on the amount by weight of the silicic acid contained in the baddeleyite.

As sulfate ion supplying substance, sulfuric acid or ammonium salts, to wit, sulfates are advantageously used. The indicated amount of 10 to 50 g./l. of $SO_4$ ions has been found necessary in order effectively chemically to attack the contaminants contained in the baddeleyite ore. With amounts less than 10 g./l. of sulfate ions in the extracting agent of the first step, an insufficient effect is obtained. However, as is clear from the above range, the amount of sulfate ions should not exceed the upper limit since otherwise zirconium oxide proper would be dissolved to an increasing extent. In summary therefore, the indicated range of 10 to 50 g./l. of sulfate ions supplied in the form of sulfuric acid or ammonium sulfate yields the best results.

The copper which is contained as contaminant in the baddeleyite ore is, as mentioned above, predominantly present in sulfidic form. In order to cause dissolution of the copper sulfide, it is necessary first to oxidize the sulfide. For this reason, nitrate ions should advantageously be present in the leaching acid of the first stage, the nitrate ions causing the desired oxidation. It is, of course, possible, however, to effect the oxidation of the copper sulfide in a different manner. From a practical point of view, however, the use of ammonium nitrate as oxidizer has proved to be particularly advantageous since, contrary to the use of, for example, potassium permanganate as oxidizer, no extraneous ion is thus introduced into the system. Further, ammonium nitrate is to be preferred over hydrogen peroxide, since the use of the latter may result in an additional hydrolysis reaction. It may be possible to eliminate the use of an oxidizer in the extracting acid if the copper is present in the baddeleyite in oxidic form. This occurs in exceptional cases.

The hydrochloric acid used in the first extraction stage should contain at least 120 g./l. of HCl. This means that the hydrochloric acid has a normality of about 4 to 6. Such a concentration of the acid, in conjunction with the fluoride and sulfate ions, is necessary to cause effective digestion of the baddeleyite and of the contaminants contained therein. Since the extraction in the first stage is carried out at elevated temperatures, to wit, temperatures above 80° C., the iron oxides which are contained as contaminants in the baddeleyite are converted into basic salts of relatively poor solubility. For this reason, it is possible to perform the extraction with hydrochloric acid of the indicated concentration, to wit, a concentration of reasonable magnitude. This, in turn, makes it possible to recycle a portion of the consumed acid obtained in the first extraction stage and to add only a relatively small portion of fresh acid to the system for each fresh batch of ore. In this manner, the procedure becomes particularly economical.

The second extraction stage primarily causes conversion of the insoluble basic iron compounds and other contaminants, as for example, titanium contaminants, into soluble chlorides. In order to prevent hydrolysis, the extraction is carried out at temperatures below 60° C., preferably below 40° C. The second extracting agent is hydrochloric acid containing at least 200 g. of HCl/l. The loss of acid caused by the extraction in this stage is extremely small. For this reason, it is possible to recycle the entire amount of the acid recovered from the second extraction stage, in conjunction with a portion of the consumed acid of the first extraction stage, to the first extraction stage of the next batch. If necessary, a small amount of fresh acid can be added. In this manner, the acid concentration of the acids used for the two extraction stages is maintained at a constant value. Further, due to this procedure, the concentration of the dissolved salts can be maintained in a constant manner.

A particular advantage of the inventive procedure resides in the fact that the monoclinic zirconium oxide is maintained in this crystalline form even after having been subjected to the acid treatment. This is particularly important from a practical point of view since the monocline zirconium oxide crystal form is the preferred one for practical application.

The invention will now be described by an example, it being understood, however, that this Example is given by way of illustration and not by way of limitation and that many changes may be effected without affecting in any way the scope and spirit of this invention as recited in the appended claims.

EXAMPLE

A baddeleyite concentrate was ground until the particle size had been reduced so that at least 95% by weight of the concentrate passed through a 100 DIN sieve. This means that the average particle size was smaller than 0.1 mm.

The baddeleyite concentrate had the following composition:

| | Percent by wt. |
|---|---|
| Zirconium and hafnium oxide | 95 |
| $SiO_2$ | 0.5 |
| $Fe_2O_3$ | 2 |
| CuS | 0.3 |

400 kg. of the ground baddeleyite material were then treated under efficient stirring and for 1½ hours at 85–90° C. with an extracting liquor comprising 360 kg. of technical concentrated hydrochloric acid (32% by weight HCl) and, 120 kg. of water. The water had been admixed with 4 kg. of ammonium nitrate, 7 kg. of ammonium bifluoride and 15 kg. of ammonium sulfate. The mixture thus obtained was then allowed to cool down and solid matter settled at the bottom of the reaction vessel. 350 kg. of supernatant consumed acid were removed after 2–2½ hours and 150 kg. of the consumed acid were discarded. The slurry remaining in the reactor which consists of consumed acid and ground and primarily extracted baddeleyite, was thereafter admixed with 150 kg. of technical concentrated hydrochloric acid and the mixture thus obtained was stirred for about 30 minutes without heating. After the reaction slurry again settled, 100 kg. of supernatant acid were removed. The residue was then washed with 2500 l. of water under stirring and after settling, the supernatant liquid was removed by decantation. The washing procedure was thrice repeated. The aqueous paste-like residue was finally passed through a suction filter and dried at 120–150° C. The refined, purified baddeleyite obtained in the form of a fine powder contained about 99.5% by weight of zirconium oxide and hafnium oxide, 0.005% by weight of $Fe_2O_3$, <0.0005% by weight CuO and about 0.1% of $SiO_2$.

The 200 kg. of remaining consumed acid emanating from the first extraction stage and 100 kg. of used acid from the second stage were combined and 60 kg. of fresh technical hydrochloric acid was added thereto. Further, the liquor was admixed with 120 kg. of water, 4 kg. of ammonium nitrate, 7 kg. of ammonium bifluoride and 7 kg. of ammonium sulfate and the liquor thus obtained was used as the acidic extracting agent for the first stage of a fresh batch of 400 kg. of finely ground baddeleyite concentrate.

While a specific embodiment of the invention has been shown and described in detail to illustrate the application of the inventive principles, it will be understood that the invention may be embodied otherwise without departing from such principles.

What is claimed is:
1. A process of refining baddeleyite which comprises
    (a) leaching comminuted baddeleyite of a particle size of less than 0.1 mm. in a first extraction stage at a temperature of above 80°C, with an acidic extracting liquor containing at least 120 g/l of HCl, about 1 to 30 g/l of fluoride ions, 10 to 50 g/l of $SO_4$ ions and—if the copper values in the baddeleyite are in the form of copper sulfide—about 2–20 g/l of $NO_3$ ions.
    (b) in a second leaching stage extracting the residue of (a) with hydrochloric acid liquor containing at least 200 g of HCl/l. at a temperature below 60°C.
    (c) separating the hydrochloric acid liquor and washing and drying the solid $ZrO_2$ thus obtained.
2. A process as claimed in claim 1, wherein the extracting step (b) is carried out at a temperature of below 40°C.
3. A process as claimed in claim 1, wherein said fluo- ride and sulfate ions are supplied to the acidic extracting liquor of stage (a) by adding the corresponding free acid or ammonium salt to the liquor.

4. A process as claimed in claim 1, wherein said nitrate ions are supplied to the acidic extracting liquor of stage (a) by adding the corresponding free acid or ammonium nitrate to the liquor.

5. A process as claimed in claim 1, wherein at least a portion of the acid liquors of stage (a) and (b) are recycled for leaching a fresh bath of baddeleyite material.

6. A cyclic process for refining baddeleyite which comprises.
   (a) leaching in a first stage comminuted baddeleyite having an average particle size of less than 0.1 mm. at a temperature of above 80° C. with a first extracting liquor containing at least 120 g. of hydrochloric acid per liter, 1 to 30 g./l. of fluoride ions, 10 to 50 g./l. of sulfate ions and—if the copper values in the baddeleyite are in the form of copper sulfide—about 2–20 g./l. of $NO_3$ irons,
   (b) removing the major portion of the first extracting liquor,
   (c) thereafter, in a second stage, leaching the solid residue at a temperature below 60° C. with a second extracting liquor essentially consisting of aqueous hydrochloric acid containing at least 200 g. HCl/l,
   (d) separating the seond extracting liquor from solid residue being $ZrO_2$ and washing and drying the $ZrO_2$ and
   (e) recycling said second extracting liquor and at least a portion of said first extracting liquor for leaching a fresh amount of baddeleyite.

References Cited

UNITED STATES PATENTS 1,796,170   3/1931   Terwilliger _____ 23—19

HERBERT T. CARTER, Primary Examiner

U.S. Cl. X.R.

23—140